(12) United States Patent
Bronswick et al.

(10) Patent No.: US 11,566,661 B2
(45) Date of Patent: Jan. 31, 2023

(54) JOINT, LINK FOR A WHEEL SUSPENSION AND METHOD FOR ASSEMBLING A JOINT

(71) Applicant: ZF Friedrichshafen AG, Friedrichshafen (DE)

(72) Inventors: Philipp Bronswick, Ostercappeln (DE); Manfred Sieve, Lohne (DE); Jan Pabst, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/275,910

(22) PCT Filed: Sep. 17, 2019

(86) PCT No.: PCT/EP2019/074797
§ 371 (c)(1),
(2) Date: Mar. 12, 2021

(87) PCT Pub. No.: WO2020/078641
PCT Pub. Date: Apr. 23, 2020

(65) Prior Publication Data
US 2021/0262517 A1 Aug. 26, 2021

(30) Foreign Application Priority Data
Oct. 15, 2018 (DE) ...................... 10 2018 217 643.4

(51) Int. Cl.
*F16C 11/06* (2006.01)
*B60G 7/00* (2006.01)
*G01D 5/16* (2006.01)

(52) U.S. Cl.
CPC .......... *F16C 11/0614* (2013.01); *B60G 7/001* (2013.01); *B60G 7/005* (2013.01);
(Continued)

(58) Field of Classification Search
CPC .............. F16C 11/0614; F16C 11/0685; F16C 2233/00; F16C 2326/05; F16C 11/0695;
(Continued)

(56) References Cited

U.S. PATENT DOCUMENTS 7,063,480 B2 6/2006 Ersoy et al.
9,030,191 B2 5/2015 Ninomiya et al.
(Continued)

FOREIGN PATENT DOCUMENTS

DE  10 2010 028 232 A1  10/2011
DE  10 2015 220 757 A1  4/2017
(Continued)

OTHER PUBLICATIONS

International Search Report Corresponding to PCT/EP2019/074797 dated Dec. 16, 2019.
(Continued)

*Primary Examiner* — Darlene P Condra
(74) *Attorney, Agent, or Firm* — Finch & Maloney PLLC

(57) ABSTRACT

A joint (10) with first and second joint components (12, 26; 19) are movably connected to one another. The first joint component (12, 26) has a spherical joint body (14, 28) and the second joint component (19) rotatably and pivotably holds the joint body (14, 28). A sensor device, for determining the position of the first and second joint components (12, 26; 19) relative to one another, is arranged on the joint (10). The sensor device has at least one sensor element (21, 31) which can be integrated in a housing (18) that is produced by an assembly overmolding process. The joint housing (18) forms the second joint component (19) in which the joint body (14, 28) is directly supported.

14 Claims, 8 Drawing Sheets

(52) U.S. Cl.
CPC .......... *G01D 5/16* (2013.01); *B60G 2204/116* (2013.01); *B60G 2204/416* (2013.01); *B60G 2206/81012* (2013.01); *B60G 2401/17* (2013.01)

(58) Field of Classification Search
CPC .. B60G 7/001; B60G 7/005; B60G 2204/116; B60G 2204/416; B60G 2206/81012; B60G 2401/17; B60G 2204/14; B60G 2206/16; B60G 2204/422; G01D 5/16
See application file for complete search history.

(56) References Cited

U.S. PATENT DOCUMENTS

| | | | |
|---|---|---|---|
| 2008/0199247 A1* | 8/2008 | Spratte | F16C 41/00 403/27 |
| 2009/0051135 A1* | 2/2009 | Lohmuller | B62D 15/021 280/124.1 |
| 2012/0124849 A1* | 5/2012 | Hiller | G01D 5/24476 33/1 PT |
| 2015/0035520 A1* | 2/2015 | Roesner | G01D 18/008 324/207.25 |
| 2017/0248505 A1* | 8/2017 | Holmes | F16C 11/0647 |
| 2018/0231051 A1 | 8/2018 | Klank et al. | |
| 2018/0251000 A1* | 9/2018 | Norton | B60G 17/01908 |

FOREIGN PATENT DOCUMENTS

| | | |
|---|---|---|
| EP | 2 266 821 A1 | 12/2010 |
| FR | 2 858 673 A1 | 2/2005 |
| WO | 03/052284 A1 | 6/2003 |

OTHER PUBLICATIONS

Written Opinion Corresponding to PCT/EP2019/074797 dated Dec. 16, 2019.

* cited by examiner

JOINT, LINK FOR A WHEEL SUSPENSION AND METHOD FOR ASSEMBLING A JOINT This application is a National Stage completion of PCT/EP2019/074797 filed Sep. 17, 2019, which claims priority from German patent application serial no. 10 2018 217 643.4 filed Oct. 15, 2018.

FIELD OF THE INVENTION

The invention relates to a joint with two joint components movably connected to one another, namely a first joint component comprising a spherical joint body and a second joint component that receives the joint body rotatably and pivotably, wherein a sensor device is arranged on the joint for determining the position of the two joint components relative to one another.

In addition the invention relates to a control arm for a wheel suspension of a motor vehicle. Finally, an object of the invention is a method for assembling a joint onto a control arm of a wheel suspension, wherein the joint comprises two joint components, a first joint component comprising a spherical joint body which is connected to a second joint component that receives the joint body rotatably and pivotably, wherein a sensor device comprising at least one sensor element is arranged on the joint for determining the position of the two joint components relative to one another.

BACKGROUND OF THE INVENTION

Chassis components, in particular joints of the type mentioned at the start, have among other things the purpose of mounting the frame of a vehicle in a sprung manner on the wheels of the vehicle. The components of the vehicle frame adapt to the condition of the road and the driving status at the time, so that a high level of safety is provided for the occupants of the vehicle. In this the joints and control arms play an important part; they are responsible for the wheel suspension and enable the vehicle to be steered.

It is known, to determine the condition or angular position of chassis components by means of a height level sensor system which detects the compression travel at the front axle and the rear axle of a vehicle. For example, by detecting the height levels a headlight range adjustment can be carried out. Moreover, by means of an electric evaluation device and/or a sensor device the angular position of a joint can be determined. By evaluating the data so obtained, the height level can be determined or, by means of an active chassis regulation, the damping of a vehicle can be adapted to the road conditions. In order to integrate a receiver unit in a chassis component such as a joint, structural space is needed for the associated electrical components and their wiring. In particular, a magnetic field sensor measures the angle for example between a spherical joint body of a first joint component and a housing of a second joint component of the joint, in that the magnetic field sensor built into a closing cover of the housing evaluates the magnetic field of a magnet fitted into the joint body. From DE 10 2010 028 232 A1 a joint of the aforesaid type is known. On the joint body of the first joint component a ball socket is fitted, which serves as a bearing for the first joint component in the joint housing of the second joint component. Joints designed in that way thus entail much assembly complexity. Furthermore, due to the fixing into the closing cover the distance between the sensor element and the magnet is comparatively large, and this influences the accuracy of the angular position measurement.

SUMMARY OF THE INVENTION

Starting from the above-described prior art, the purpose of the present invention is now to develop further a joint, a control arm and a method for assembling a joint onto a control arm so as to simplify the assembly process.

From the standpoint of equipment, starting from the preamble of the independent claim(s) this objective is achieved in combination with the characterizing features of the independent claim(s). A control arm for a wheel suspension with which at least one joint according to the invention is used, is the object of the claims. From the standpoint of method, the objective is achieved starting from the preamble of the independent the claims, in combination with its characterizing features.

The dependent claims that follow the independent claims in each case indicate advantageous further developments of the invention.

According to the invention a joint with two joint components connected movably to one another is proposed, namely a first joint component comprising a spherical joint body and a second joint component which holds the joint body rotatably and pivotably, wherein a sensor device for determining the position of the two joint components relative to one another is arranged on the joint. To simplify the assembly of such a joint, according to the invention it is provided that the sensor device comprises at least one sensor element which can be integrated in a joint housing produced by an assembly injection-molding process, wherein the joint housing forms the second joint component in which the spherical joint body is fitted directly. The joint housing forming the second joint component holds at least the first joint component during its production. This eliminates the assembly step of pressing the first joint component into the joint housing. At the same time the second joint component serves directly to form a bearing for the spherical joint body of the first joint component, so that the use of a ball socket can be omitted.

According to an embodiment, the at least one sensor element can be overmolded into the joint housing. The at least one sensor element is in that case integrated directly in the joint housing during the production process of the latter, so that no further assembly step is required.

Alternatively, for the arrangement of the at least one sensor element a receiving recess can be formed in the joint housing. The formation of the receiving recess can also be integrated in the production process of the joint housing. On completion of the assembly injection molding process the at least one sensor element can be positioned in the receiving recess. Compared with the arrangement according to the prior art, this has the advantage that the assembly steps of pushing a ball socket onto the joint body of the first joint component and the subsequent pressing into the housing element are eliminated. Since the receiving recess is directly in the joint housing, compared with the prior art the distance between the at least one sensor element and the joint body can also be made smaller.

In particular, the at least one sensor element can be in the form of a magneto-resistive sensor.

In that case a position magnet can be let into the recess on the surface of the joint body, which magnet is associated with the sensor element.

An advantage is that the sensor element can be designed to seal the recess containing the position magnet arranged in it. In that way, during the assembly injection molding process, material can be prevented from making its way into the area of the recess and between the position magnet and the sensor element. For that purpose a covering element can be provided on the side of the sensor element that faces toward the receiving recess. The covering element preferably has a contour that corresponds to the shape of the recess. In that way the covering element can overlap the edges of the recess. At the same time, by means of the covering element the sensor element can be positioned a small distance away from the position magnet. The sensor element with its covering element are pressed against the surface of the joint body before the overmolding process. The sensor element is orientated perpendicularly to the recess, so that the covering element seals the recess completely.

Furthermore, the formation of the joint housing as a direct bearing for the joint body provides the possibility of using a sensor element based on some other measurement method. For example, the sensor element of the sensor arrangement can be in the form of an incremental transducer. According to the invention, the design of the joint housing produced in the assembly injection molding process and formed onto the joint body of the first joint component enables the use of a sensor element in the form of an incremental transducer as an alternative to the use of a magneto-resistive sensor. The use of another measurement method is made possible by the fact that due to the direct fitting of the joint body into the second joint component, the distance between the joint body and the sensor element integrated in the joint housing can be minimized. This is particularly so if the at least one sensor element is injection-molded into the joint housing.

Preferably, the sensor element in the form of an incremental transducer is designed for photoelectric scanning or for magnetic scanning. In such a case the incremental transducer designed for photoelectric scanning can work according to an imaging measuring principle or an interferential measuring principle. Then, if an incremental transducer is used as the sensor, the intrusion into the working surface can be minimized.

For that purpose, a measurement standard that extends in the circumferential direction can be provided on the surface of the joint body. The measurement standard is designed in accordance with the design or measurement principle of the incremental transducer. The measurement standard can be essentially in the form of a band or strip. The measurement standard can extend at least in sections in the circumferential direction over the working surface. The advantage of this is that the measurement standard can be attached to the joint body in such manner that it produces almost no irregularities on the surface of the joint body, or none at all. The at least one sensor element can be positioned with a further reduced separation distance than is possible with a magneto-resistive sensor. Also, the sealing of the position magnet by the sensor element, required in the latter case, is not needed.

For example the measurement standard can be in the form of a pole wheel, a magnetic strip or a barcode. The magnetic strip can be let into a groove machined in the surface of the joint body. It is also conceivable to stick the magnetic strip or the pole wheel onto the surface of the joint body. A measurement standard in the form of a barcode can also be let into a groove or stuck to the surface of the joint body. Then, the depth of the groove can be chosen such that the measurement standard terminates flush or almost flush with the adjacent working surface. In addition, a barcode essentially in band or strip form can be produced by knurling, engraving or laser etching, at least in sections around the surface of the joint body. Compared with the depth of the recess for receiving a position magnet, the depth of the groove is substantially smaller so that the joint body is weakened only very slightly.

Preferably, the joint can be in the form of a ball joint or a sleeve joint.

Furthermore, the objective stated to begin with is achieved by a control arm with at least one joint for a wheel suspension of a motor vehicle, wherein the at least one joint arranged on the control arm is made in accordance with any of the claims. The control arm is preferably a stamped and bent component having at least one receiving section for a joint according to the invention. The at least one receiving section is formed by wall segments of the control arm that extend parallel to one another at least in part, which segments have eyelets arranged essentially coaxially. The eyelets serve to hold the joint.

In addition the invention relates to a method for assembling a joint onto a control arm of a wheel suspension, wherein the joint comprises two joint components, namely a first joint component comprising a spherical joint body, which is connected to a second joint component that receives the joint body rotatably and pivotably, wherein on the joint a sensor device comprising at least one sensor element for determining the position of the two joint components relative to one another is arranged, wherein, in a first step the joint body of the first joint component is positioned relative to the control arm in at least one receiving section of the control arm and, in a second step, at least the joint body of the first joint component is overmolded, whereby the overmolding produces the joint housing that forms the second joint component, in which the at least one sensor element is integrated and in which the spherical joint body is fitted directly.

Preferably, the at least one sensor element can be positioned relative to the joint body before the overmolding. Thus, the at least one sensor element can be integrated in the joint housing formed during the overmolding process. This eliminates the assembly step of attaching the at least one sensor element to the joint housing.

In that way the at least one receiving section can be formed by wall segments of the control arm that extend parallel to one another, at least in sections, which sections have essentially coaxially arranged eyelets in which at least the first joint component can be positioned before the overmolding process. The joint housing produced by overmolding at least the joint body of the first joint component, can then enclose the two wall segments during the subsequent overmolding, at least in sections.

BRIEF DESCRIPTION OF THE DRAWINGS

Advantageous embodiments of the invention, which will be explained below, are illustrated in the drawings, which show.

DETAILED DESCRIPTION OF THE PREFERRED EMBODIMENTS

Figure 1:
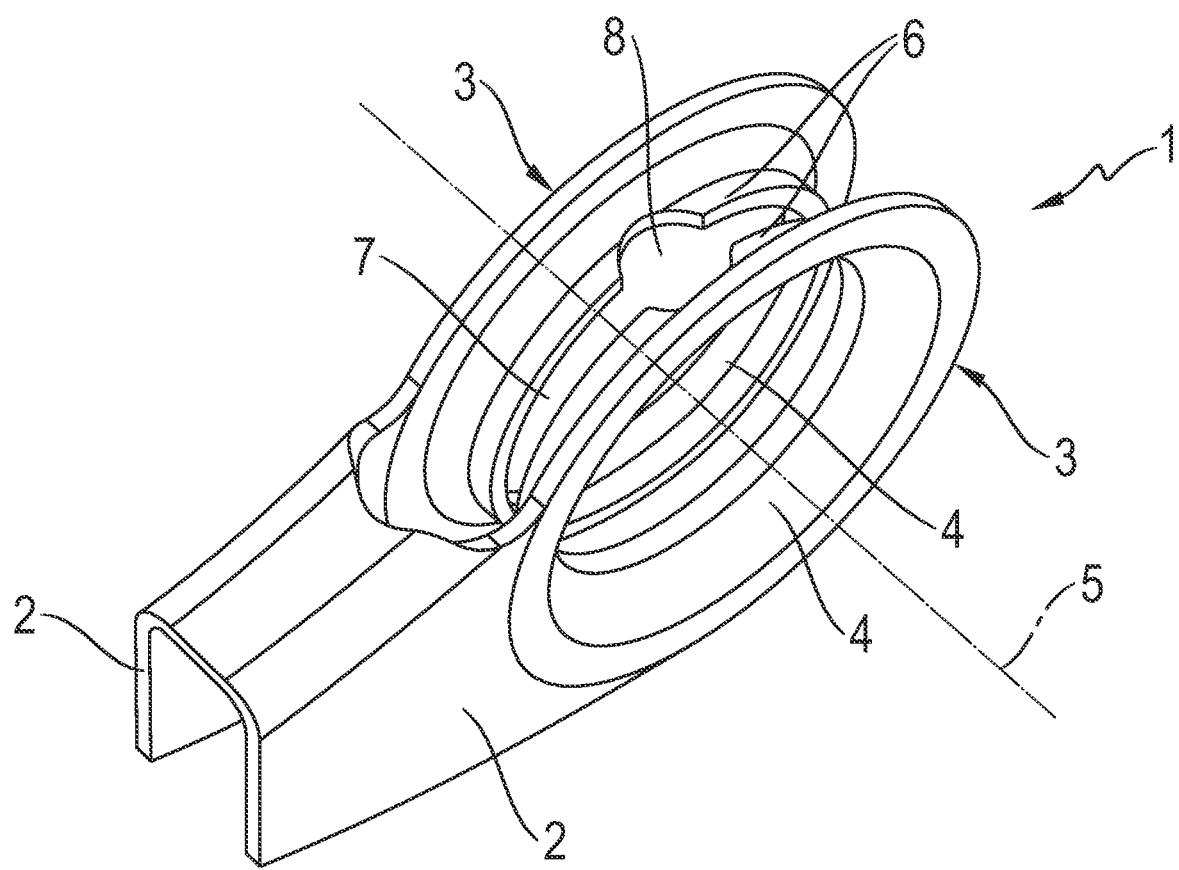
FIG. 1: A partial perspective view of a control arm.

FIG. 1 shows a partial perspective view of a control arm 1 for a wheel suspension. The control arm 1 is preferably a metallic stamped and bent component, in particular made of steel. The control arm 1 in the form of a stamped and bent component has a U-shaped cross-section with two wall sections 2 extending parallel to one another. At least at one end of the control arm 1 the wall sections 2 are made as receiving sections 3. The receiving sections 3 are connected to the U-shaped wall sections 2 and are essentially of circular shape. The receiving sections 3 each have an eyelet 4, which is arranged coaxially with an axis of symmetry 5 of the receiving sections 3. On the inner side of the respective receiving section 3, there is in each case a section 6 that extends in the axial direction. The two sections 6 are separated a distance apart from one another by an annular gap 7. Viewed in the circumferential direction, the annular gap 7 is interrupted at one point by a circular cut-out 8.

The receiving section 3 serves to accommodate a joint 10, whose arrangement in the receiving sections 3 of the control arm 1 will be described below with reference to FIGS. 2 to 4. On the joint 10 is arranged a sensor device for determining the position of two joint components 12, 19 relative to one another. By virtue of the sensor arrangement shown in the example embodiment illustrated, which sensor works in accordance with the magneto-resistive effect, an angular change of the two joint components 12, 19 is detected, by means of which an external height level sensor system which detects a compression travel at a front axle and a rear axle of a vehicle in order to determine the condition or the angular position of chassis components, can be realized.

Figure 2:
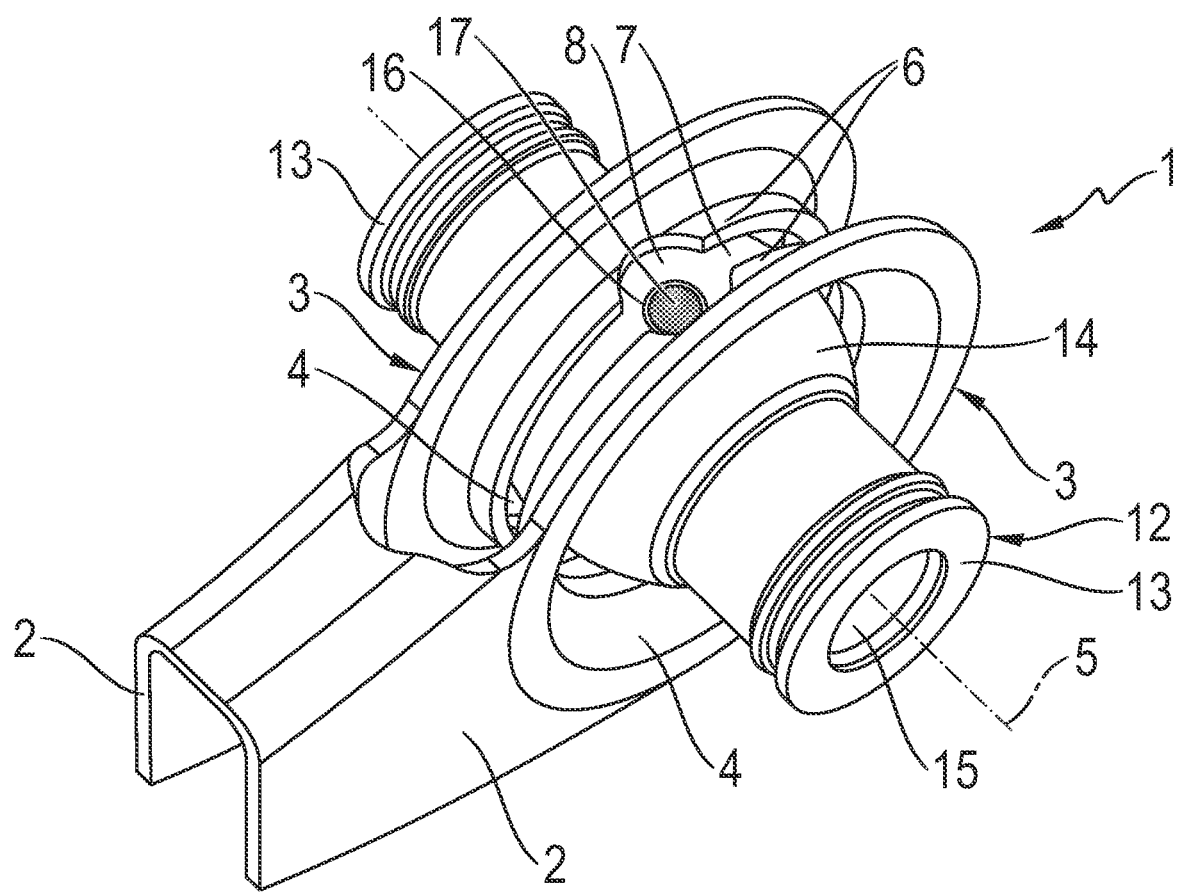
FIG. 2: A partial perspective view according to FIG. 1, with a first joint component of a sleeve joint positioned in the control arm.

FIG. 2 shows a partial perspective view as in FIG. 1, with a first joint component 12 of a joint 10 in the form of a sleeve joint 11. The first joint component 12 has two projections 13 and a spherical joint body 14. The projections 13 and the joint body 14 are provided with a through-going bore 15. On the surface of the joint body 14 is formed a recess 16 which holds a position magnet 17 fixed therein.

Figure 3:
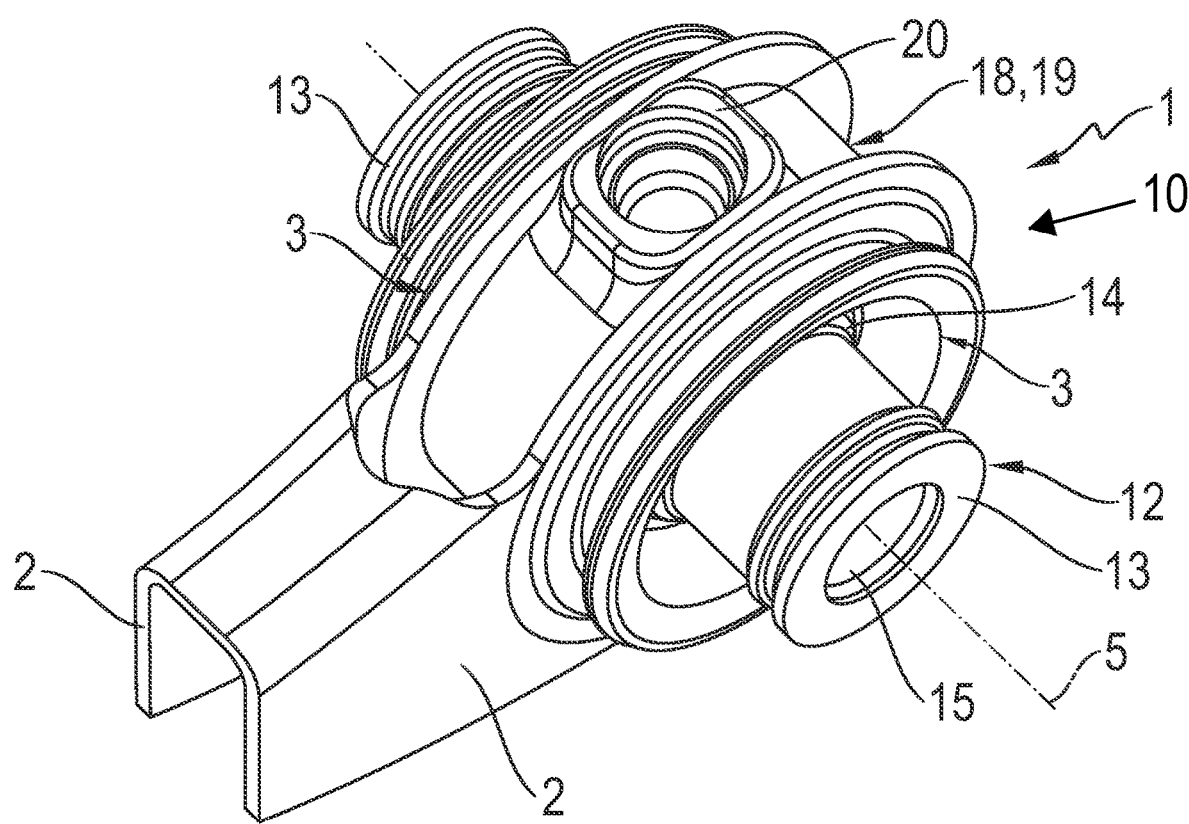
FIG. 3: A partial perspective view according to FIG. 2, with a joint housing formed by overmolding the first joint component.

The illustration in FIG. 3 shows a partial perspective view as in FIG. 2, with a joint housing 18 formed by overmolding the joint body 14 of the first joint component 12. For this, the control arm 1 and the first joint body 12 are positioned relative to one another. At least one multi-component die surrounds the joint body 14, while further single- or multi-component dies can be positioned at the sides of the receiving sections 3. This enables the joint body 14 and, in sections, also the receiving sections 3, to be overmolded in order to produce the joint housing 18 that forms the second joint component 19 of the joint 10. The second joint component 19 is made from a plastic. Suitable shaping of the die makes it possible at the same time to form a recess 20 in the joint housing 18, above the position magnet 17. The recess 20 is partially arranged in the cut-out 8, which corresponds to the location of the position magnet 17.

The recess 20 enables the positioning of a sensor element 21 in the form of a magneto-resistive sensor a small distance away from the position magnet 17. The joint housing 18 produced by the assembly injection-molding process, which housing forms the second joint component 19, forms a direct bearing for the joint body 14 of the first joint component 12. This simplifies the assembly of the joint 10 and its attachment to the control arm 1. The overmolding at least of the joint body 14 positioned in the control arm 1 to form the joint housing 18 eliminates the fitting of the joint housing 18 into the receiving sections 3 and the pressing of the first joint component 12 into the joint housing 18. In order to prevent the imperfection of the surface of the joint body 14 in the area of the recess 16 for the position magnet 17 from being reproduced on the inner surface of the joint housing 18 that is in contact with the joint body 14, a shell-shaped element can enclose the joint body 14 in sections and completely cover the recess 16 and the position magnet 17 arranged therein.

Figure 4:
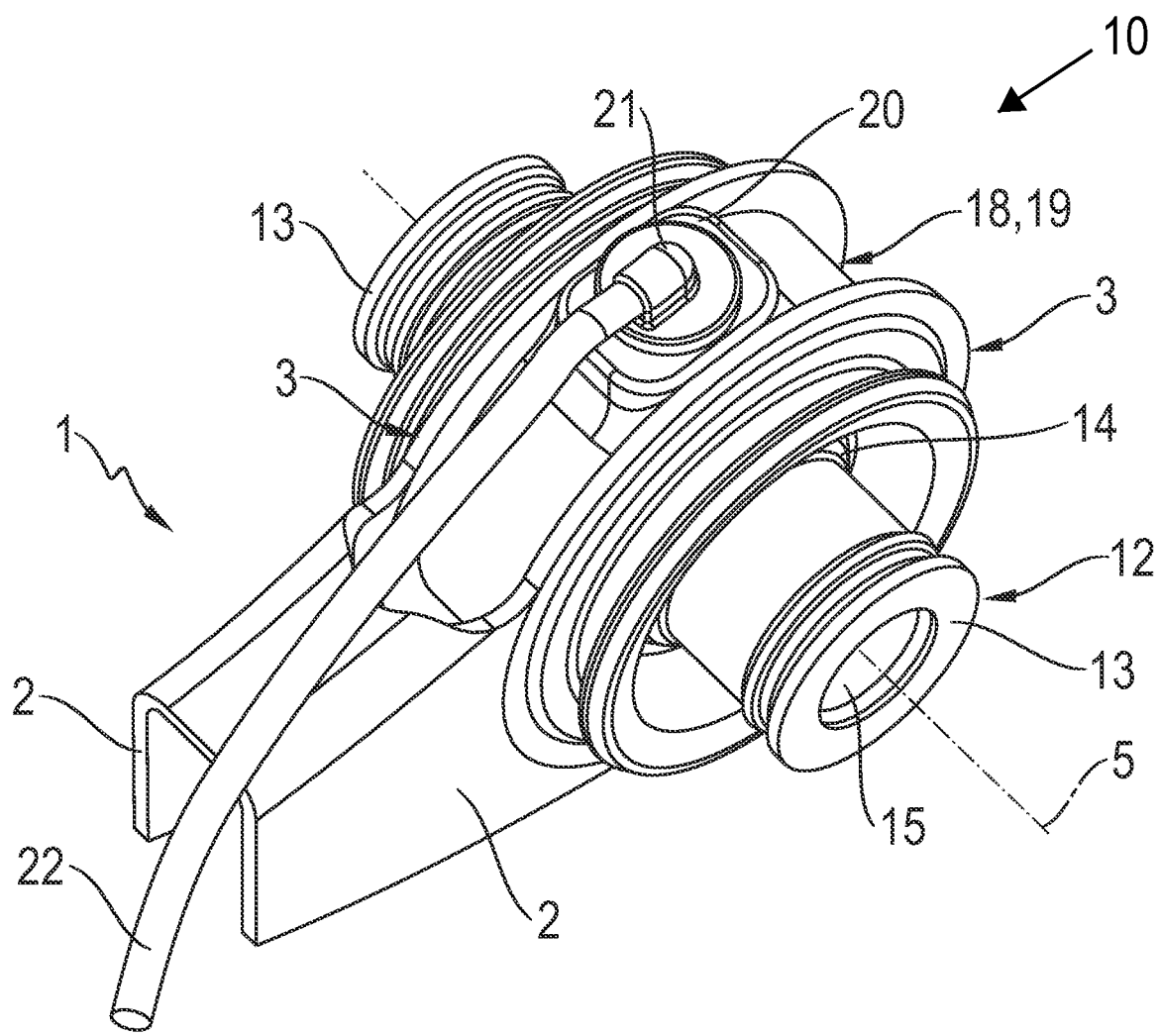
FIG. 4: A partial perspective view according to FIG. 3, with a sensor element integrated in the joint housing.

FIG. 4 shows a partial perspective view as in FIG. 3, with the sensor element 21 integrated in the joint housing 18. The at least one sensor element 21 is inserted into the recess 20 and fixed therein. A signal line 22 connects the sensor element 21 to an external control device for evaluating the sensor signals.

Figure 5:
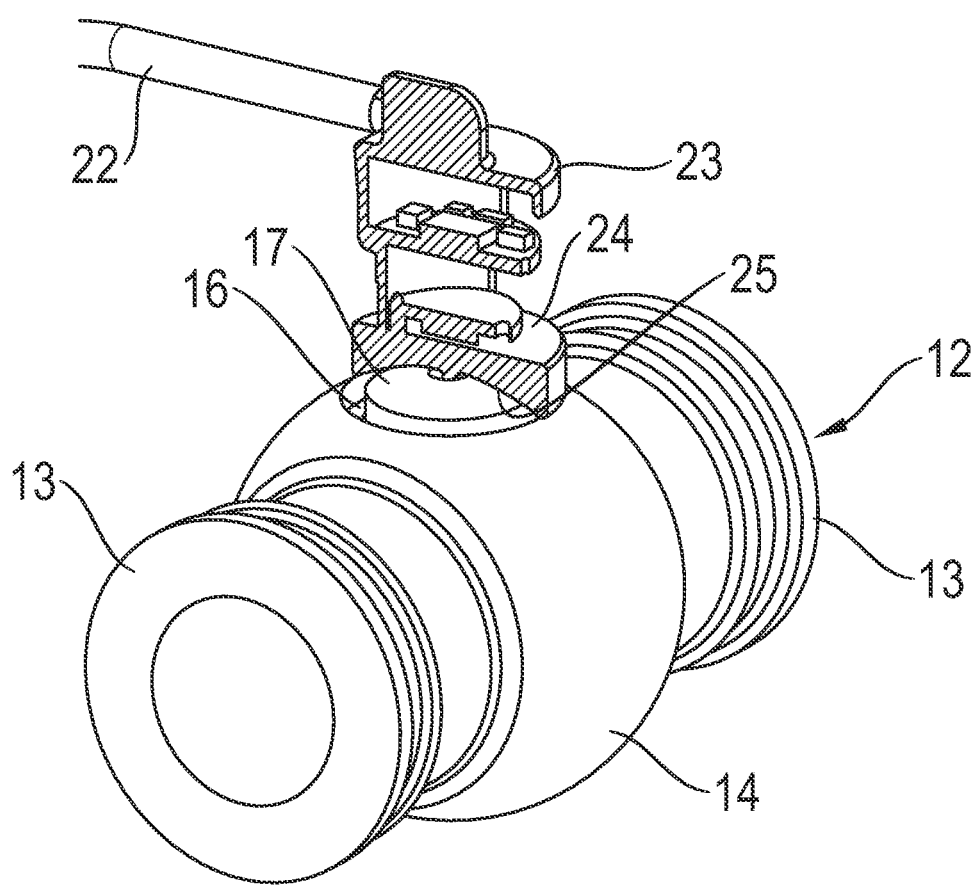
FIG. 5: A perspective view of the first joint component with a sensor element shown in partial section, according to a second embodiment, before overmolding.

FIG. 5 shows a perspective view of the first joint component 12 with a sensor element 23 shown in partial section, according to a second embodiment, before overmolding. The at least one sensor element 23 is again in the form of a magneto-resistive sensor. In contrast to the arrangement of the sensor element 21 in the recess 20 formed to hold it on the second joint component 19, in this second embodiment the sensor element 23 is positioned, relative to the joint body 14 and together with the first joint component 12 relative to the control arm 1, before the assembly injection-molding for producing the joint housing 18 or second joint component 19. In this case the sensor element 23 has the additional function of completely sealing or closing off the imperfection in the surface of the joint body 14 in the area of the recess 16 for the position magnet 17 during the overmolding of the joint body 14, so that during the assembly injection-molding no material makes its way into that area. For that purpose, on its side facing toward the position magnet 17 the sensor element 23 has a covering element 24. On its underside 25 that faces toward the joint body 14, the covering element 24 ends essentially flush with the recess 16. In that way the necessary mobility for fulfilling the bearing function of the joint housing 18 can be ensured. Thus, the additional effect is that the assembly of the arrangement with at least one sensor element 23 can be omitted. The recess 16 is sealed when positioning the control arm 1, the first joint component 12 and the sensor element 23, before the overmolding process, in that the sensor element 23 is pressed over the recess 16 and against the joint body 14.

Figure 6:
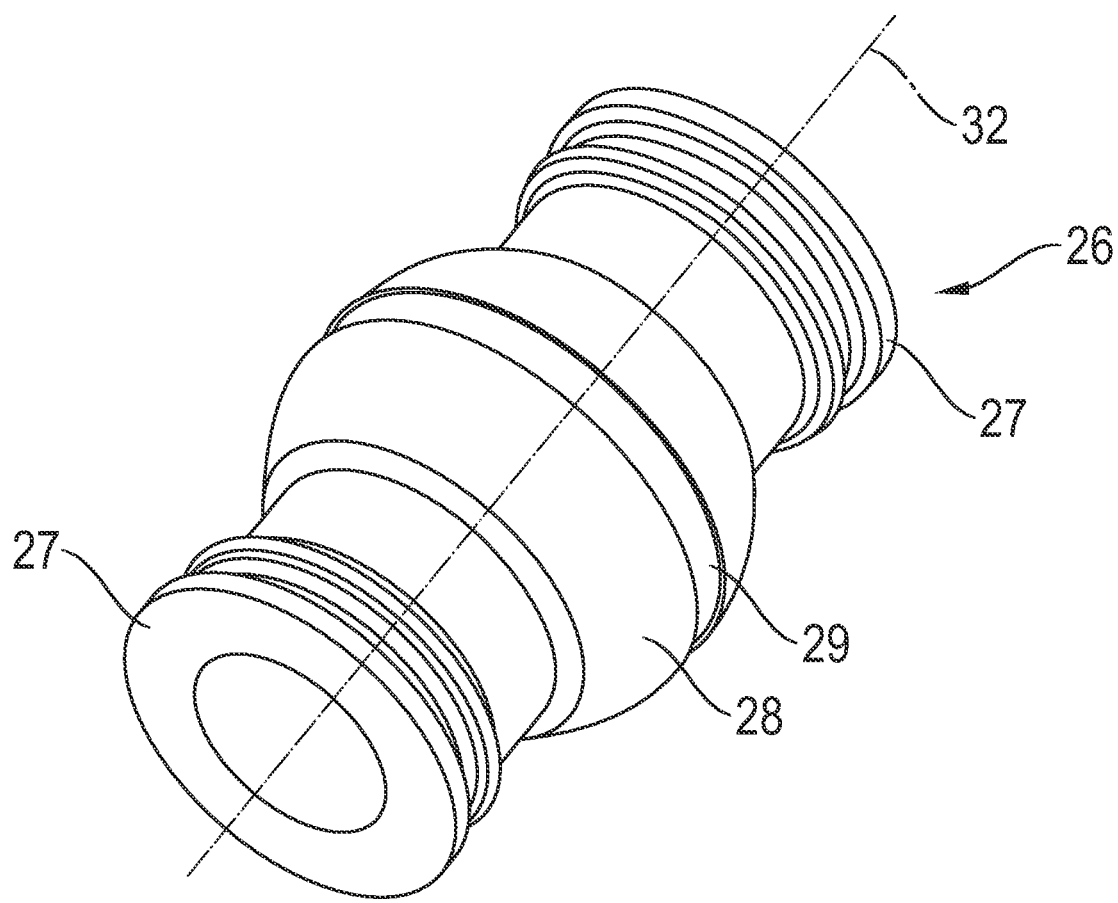
FIG. 6: A perspective view of a first joint component according to a further embodiment.

The illustration in FIG. 6 shows a perspective view of a first joint component 26 according to a third embodiment. The first joint component 26 also has two projections 27 and a spherical joint body 28. The first joint component 26 is made of a metal. In this embodiment at least one sensor element 31 is integrated in the joint housing 18 by overmolding, which sensor is in the form of an incremental transducer. For this, the at least one sensor element 31 in the form of an incremental transducer can be designed for magnetic scanning or for photoelectric scanning. A measurement standard 30 required for that can be in the form of a pole wheel or a magnetic strip, or a barcode. In the example embodiment shown, the measurement standard 30 is arranged in an all-round groove 29 on the surface of the joint body 28. The groove 29 extends coaxially with the longitudinal axis 5 in the area of the maximum outer diameter of the joint body 28. Compared with the recess 16 for the position magnet 17 the depth of the groove 29 is much smaller, so that the joint body 28 is weakened less.

Figure 7:
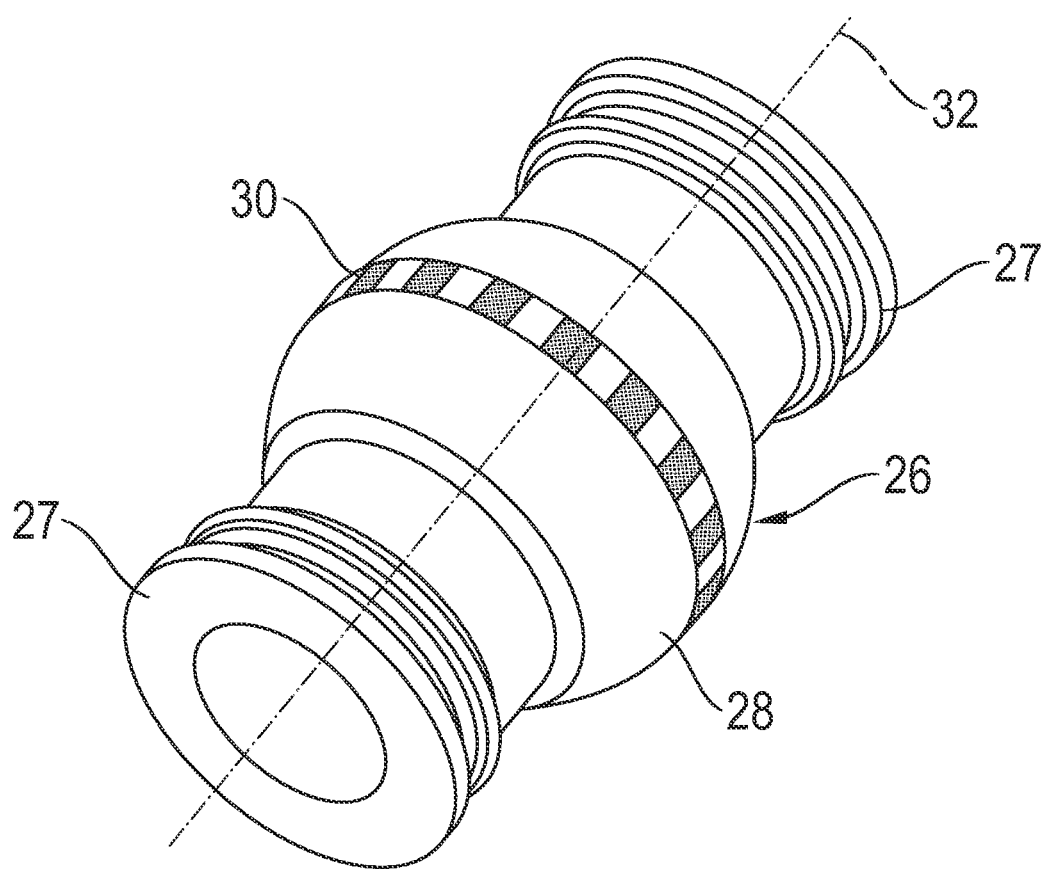
FIG. 7: A perspective view of the first joint component according to FIG. 6, with a measurement standard arranged on it.

FIG. 7 shows a perspective view of the first joint component according to FIG. 6 with a measurement standard 30 arranged on it. As can be seen from the figure, the groove 29 can be filled by the measurement standard 30 in such manner that there are virtually no imperfections.

Figure 8:
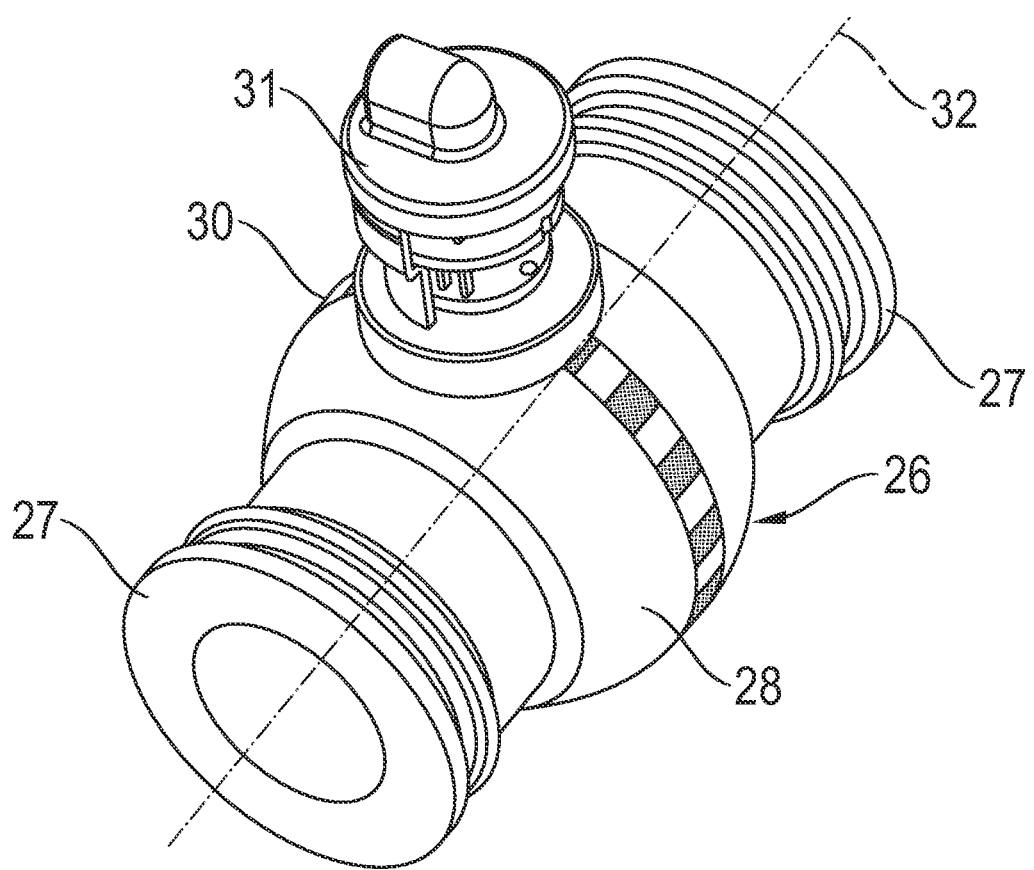
FIG. 8: A perspective view of the first joint component according to FIG. 7, with a sensor element.

FIG. 8 shows a perspective view of the first joint component 26 according to FIG. 7 with the at least one sensor element 31 positioned relative to the joint body 28 and the measurement standard 30. The sensor element 31 can be positioned a minimal distance away from the surface of the joint body 28 before at least the joint body 28 of the first joint component 26 together with the sensor element 31 are overmolded, as already described earlier.

An embodiment of the measurement standard as a barcode can be produced on the surface of the joint body 28 by knurling, engraving or laser etching. Likewise, a barcode can be fixed into the groove. In the simplest case a barcode can be stuck on. With this design of the measurement standard as well, there is only minimal interference with the surface contour of the joint body 28.

INDEXES

1 Control arm
2 Wall section
3 Receiving section
4 Eyelet
5 Axis of symmetry
6 Section
7 Gap
8 Cut-out
10 Joint
11 Sleeve joint
12 First joint component
13 Projection
14 Joint body
15 Bore
16 Recess
17 Position magnet
18 Joint housing
19 Second joint component
20 Recess
21 Sensor element
22 Signal line
23 Sensor element
24 Cover element
25 Underside
26 First joint component
27 Projection
28 Joint body
29 Groove
30 Measurement standard
31 Sensor element
32 Longitudinal axis

The invention claimed is:

1. A joint comprising:
first and second joint components being movably connected to one another,
the first joint component comprising a spherical joint body and the second joint component that rotatably and pivotably holds the joint body,
a sensor device being arranged on the joint for determining a position of the first and the second joint components relative to one another,
the sensor device comprising at least one sensor element which is integrated in a joint housing, and the at least one sensor element and the joint body being overmolded into the joint housing, and the joint housing forms the second joint component and contacts the joint body such that the second joint component forms a direct bearing for the joint body.

2. The joint according to claim 1, wherein the at least one sensor element is overmolded into the joint housing.

3. The joint according to claim 1, wherein at least one recess is formed on the joint housing which receives the at least one sensor element.

4. The joint according to claim 1, wherein the at least one sensor element is in a form of a magneto-resistive sensor.

5. The joint according to claim 4, wherein a position magnet, associated with the sensor element, is received into a recess on a surface of the joint body.

6. The joint according to claim 5, wherein the sensor element is designed to seal the recess in which the position magnet is arranged.

7. The joint according to claim 1, wherein the sensor element is in a form of an incremental transducer.

8. The joint according to claim 7, wherein the sensor element, in the form of the incremental transducer, is designed for one of photoelectric scanning or for magnetic scanning.

9. The joint according to claim 1, wherein the joint is in a form of a ball joint or a sleeve joint.

10. A control arm with at least one joint for a wheel suspension of a motor vehicle, wherein the at least one joint arranged on the control arm is designed in accordance with claim 1.

11. A joint comprising:
first and second joint components being movably connected to one another,
the first joint component comprising a spherical joint body and the second joint component that rotatably and pivotably holds the joint body,
a sensor device being arranged on the joint for determining a position of the first and the second joint components relative to one another,
the sensor device comprising at least one sensor element which is integrated in a joint housing, and the at least one sensor element and the joint body being overmolded into the joint housing, and the joint housing forms the second joint component and contacts the joint body such that the second joint component forms a direct bearing for the joint body,
the sensor element is in a form of an incremental transducer, and
a measurement standard that extends in a circumferential direction is provided on a surface of the joint body.

12. The joint according to claim 11, wherein the measurement standard is in a form of a magnetic strip or a barcode.

13. A method for assembly of a joint on a control arm of a wheel suspension, wherein the joint has first and second joint components, the first joint component has a spherically shaped joint body, which is connected to the second joint component that rotatably and pivotably holds the joint body, a sensor device comprising at least one sensor element is arranged on the joint for determining a position of the first and the second joint components relative to one another, the method comprising:
positioning the joint body of the first joint component relative to the control arm in at least one receiving section of the control arm; and overmolding at least the joint body of the first joint component, wherein by means of the overmolding a joint housing that forms the second joint component is made, such that the at least one sensor element is integrated into the joint housing and the joint housing forms a direct bearing for the spherical joint body, and positioning the at least one sensor element relative to the joint body of the first joint component before the overmolding process.

14. The method according to claim 13, wherein the at least one receiving section is formed in wall segments of the control arm that in part extend parallel to one another, the wall segments each has an eyelet and the wall segments are arranged such that the eyelets are substantially coaxial with each other, and the method further comprising:

positioning at least the first joint component in the eyelets before the overmolding process.

* * * * *